(12) United States Patent
Lo et al.

(10) Patent No.: US 7,634,634 B2
(45) Date of Patent: Dec. 15, 2009

(54) DATA SEARCH APPARATUS AND A METHOD THEREOF

(75) Inventors: Yung-Chieh Lo, Miao-Li (TW); Jin-Ru Chen, Hsinchu (TW); Jiann-Haur Huang, Changhua County (TW)

(73) Assignee: Realtek Semiconductor Corp., HsinChu (TW)

( * ) Notice: Subject to any disclaimer, the term of this patent is extended or adjusted under 35 U.S.C. 154(b) by 405 days.

(21) Appl. No.: 11/750,339

(22) Filed: May 18, 2007

(65) Prior Publication Data

US 2007/0283126 A1    Dec. 6, 2007

(30) Foreign Application Priority Data

May 18, 2006    (TW) .............................. 95117741 A

(51) Int. Cl.
*G06F 12/00* (2006.01)
(52) U.S. Cl. ...................................... 711/217; 711/165
(58) Field of Classification Search ....................... None
See application file for complete search history.

(56) References Cited

U.S. PATENT DOCUMENTS 6,396,842 B1 * 5/2002 Rochberger ................. 370/408
6,581,106 B1 * 6/2003 Crescenzi et al. ........... 709/242

* cited by examiner

*Primary Examiner*—Kevin Verbrugge
(74) *Attorney, Agent, or Firm*—Winston Hsu

(57) ABSTRACT

A data search apparatus and method are disclosed for searching for a target address of a target data in a memory. The data search apparatus includes a data sort module, an address assignment module, an address transformation module, and at least one comparative module.

The data sort module sorts a plurality of data in said memory. The address assignment module assigns an address to each of said plurality of data. The address transformation module transforms said address into a new address according to an address transformation procedure. And the at least one comparative module obtains a portion of bits of said target address of said target data according to a comparative data and said target data. Accordingly, the time complexity for data search is then reduced.

25 Claims, 2 Drawing Sheets

DATA SEARCH APPARATUS AND A METHOD THEREOF

BACKGROUND OF THE INVENTION

1. Field of the Invention

The present invention relates to a data search method and an apparatus thereof, and more particularly, to a data search method and an apparatus capable of rearranging data addresses in memory space.

2. Description of the Prior Art

Hardware/Software Co-Design is very import for designing system on chip. In Hardware/Software Co-Design, applications required can be formulated previously, such as classifying applications implemented by software or by hardware. The major consideration for those formulations is usually cost and efficiency. Search is a usual demand for network and related application. A specific memory structure is usually utilized on hardware, such as Content Addressable Memory (CAM) with complexity of search time O (1). However, CAM requires expensive hardware and high power consumption, and thus cannot be accepted. On the other hand, conventional Linear Search with higher complexity of search time O (N) is less expensive, where N is data number needs to be searched.

In Binary Search, a memory space is divided into two parts by the values of all data in the memory space, where the data with smaller value are in the first part and the data with larger value arc in the second part. The value of a middle data in the middle of the memory space is compared with the value of a target data. If the value of the target data is smaller than the value of the middle data, the target data is in the first part of the memory space. If the value of the target data is larger than the value of the middle data, the target data is in the second part of the memory space. And if the value of the target data equals the value of the middle data, the target data equals the middle data. For a memory space, having 64 data, it takes at most 6 ($\log_2 64=6$) rounds to find the target data by recursive search.

SUMMARY OF THE INVENTION

For higher search efficiency, a data search apparatus and method thereof is disclosed according to an embodiment of the present invention to achieve the complexity of search time to O ($\log_c$ N), where N is the number of data in memory and C is the number of logic unit in hardware. Therefore, cost and efficiency can be controlled by adjusting the number of the logic unit C.

These and other objectives of the present invention will no doubt become obvious to those of ordinary skill in the art after reading the following detailed description of the preferred embodiment that is illustrated in the various figures and drawings.

DETAILED DESCRIPTION

Figures 1, 2:
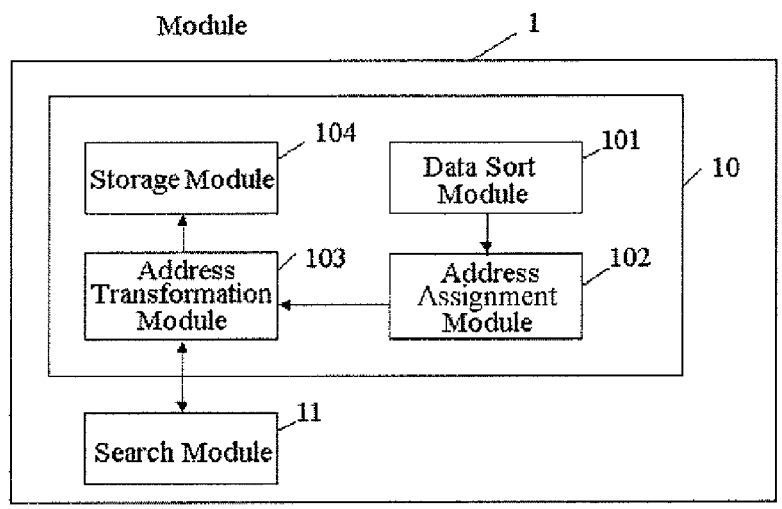
FIG. 1 is a fundamental schematic diagram illustrating a data search apparatus according to an embodiment of the present invention.
FIG. 2 is a diagram illustrating the data in the memory before transformation according to an embodiment of the present invention.

FIG. 1 is a fundamental schematic diagram illustrating a data search apparatus 1 according to an embodiment of the present invention. The data search apparatus 1 includes a search module 11 and a data storage module 10. In one embodiment, the search module 11 can be implemented by including a comparator. The data storage module 10 includes a data sort module 101, an address assignment module 102, an address transformation module 103 and a storage module 104. The operation of the data search apparatus 1 is described in the following example having 64 data in a memory space according to an embodiment of the present invention.

FIG. 2 is a diagram illustrating the data in a memory 20 before transformation according to an embodiment of the present invention. The memory 20 includes 64 sets of data and corresponding memory addresses thereof. The 64 data in the memory 20 are sorted by values of the data incrementally by the data sort module 101 at first, and the memory addresses from 000000 to 111111 are assigned to each data by the address assignment module 102. For instance, the value of the first data in the memory 20 is 5, and the corresponding memory address of the first data is 000000. Please note that the data can also be sorted in other ways. In another embodiment, the data are sorted by values decreasingly.

Figure 3:
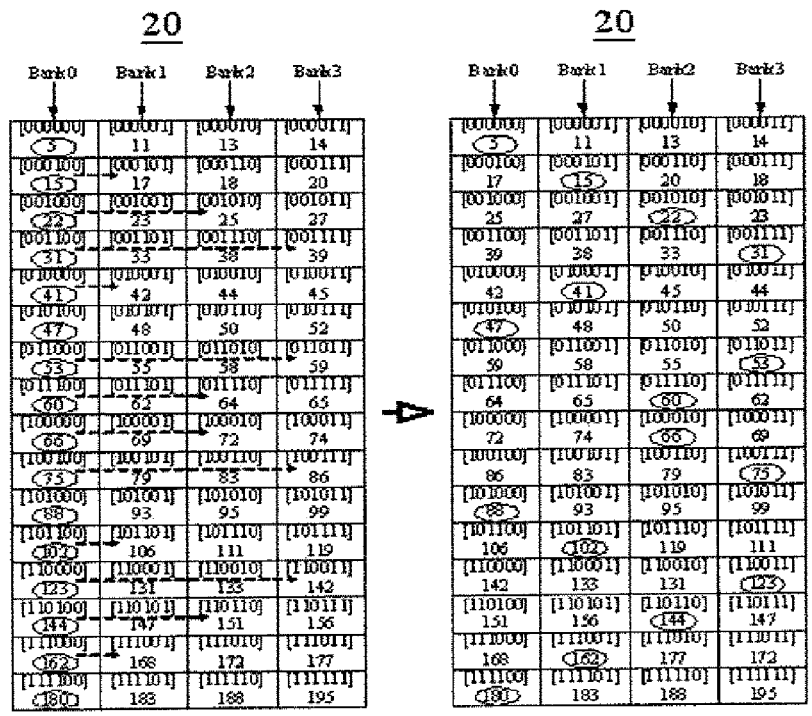
FIG. 3 is a diagram illustrating the data in the memory before transforming and after transformation according to an embodiment of the present invention.

FIG. 3 illustrates an embodiment of the present invention. The memory address of each data in the memory 20 is transformed into a new memory address by the address transformation module 103 according to an address transformation procedure. For example, the memory address with a value of 15 is transformed from 000100 into 000101, and the memory address with a value of 17 is transformed from 000101 into 000100. As shown in FIG. 3, the content of the left table in FIG. 3 is not transformed yet, and the content of the right table in FIG. 3 is generated by the address transformation module 103. After the address transformation procedure, the memory 20 is partitioned into four banks longitudinally by four search modules 11, and each bank corresponds to one of the four comparators respectively, meaning that a search modules 11 only accesses a corresponding bank of memory and the number of the banks equals the number of the search modules 11. In one embodiment of the present invention, the search module 11 includes at least one comparator. After partitioning the memory into four parts equally, the four search modules 11 search for the value of the target data in at most 3 times ($\log_4 64=3$) in a way similar to binary search, where the number of the search modules 11 is 2 to the power of n (i.e. $2^n$), where n is an integer.

In one embodiment of the present invention, for convenience of the mentioned transformation, the size (symbol S) of the memory 20 is 2 to the power of n (i.e. $2^n$), where n is an integer. The size (symbol S) of the memory 20 also satisfies a mathematic equation ($S=2^x$), where x is the length of the memory address, i.e. x is the number of bits of the memory address. In addition, for the memory space partitioned into a plurality of banks, the number (symbol C) of the plurality of banks is 2 to the power of n (i.e. $2^n$), where n is an integer, and the number (symbol C) of the plurality of banks satisfies a mathematic equation ($C=2^y$), where y is an integer. In one embodiment, the size S of the memory is 64; the number x of bit of the memory address is 6; and the integer y is 2.

In the process of address transformation, to generate the new memory addresses, the memory address (symbol A) is further divided into (x/y) blocks. In one embodiment of the present invention, the each memory address is divided into A ((x/y)−1), A ((x/y)−2), . . . , A (1), A (0) from the most significant bit to the least significant bit. In the example with the memory size 64 and the bit number 6 of the memory address, each memory address can be divided into three blocks, A (2), A (1), and A (0) of the memory address 000100 being divided into 00,01 and 00.

The address transformation procedure (symbol M) is described as follows. The address transformation procedure performs a logic operation for the adjacent segments of the memory address For example, A (2) XOR A (1) results in the first result, 01. Then, the first result 01 XOR A (0) results in the second result, 01. At last, A (0) is adjusted from 00 to 01. In this embodiment, if the four addresses of data in the same row are required to be rearranged, simply A (0) needs to be adjusted.

According to the above-mentioned embodiment, the address transformation procedure M (A (0)) can be regarded as A' (0). And the equation of A' (0) in this embodiment according to the present invention operates as follows:

$$A'(0)=A((x/y)-1) \oplus A((x/y)-2) \oplus \ldots \oplus A(1) \oplus A(0).$$

The new address M (A) A' after being adjusted is A ((x/y)−1), A ((x/y)−2), . . . , A (1) and A' (0) in order.

In the mentioned embodiment of the present invention, the address transformation procedure utilizes XOR operation for the convenience of hardware design and the invertibility of XOR operation. The invertibility of XOR operation facilitates computation of the search module 11. For example, the memory address can be represented from the most significant bit to the least bit as A ((x/y)−1), A ((x/y)−2), . . . , A ((x/y)−(n+1)), A ((x/y)−(n)), A ((x/y)−(n−1)), . . . , A (1) and A (0) in order, where A ((x/y)−1), . . . , A ((x/y)−(n+1)) are fixed values and A ((x/y)−(n−1)), . . . , A (1) are 0. For the select search value of the search module 11, A (0) equals 0. Thus, A ((x/y)−n) can be obtained by inverse calculation as follows:

$$A((x/y)-n)=A((x/y)-1) \oplus A((x/y)-2) \oplus \ldots \oplus A((x/y)-(n+1)) \oplus A'(0).$$

After the address transformation, an example is presented for the following description, the value of the target data being 50. Referring to the right table transformed in FIG. 3, as the value of the target data is 50, the search steps includes:

In every round of search, one comparative data from each of the plurality of banks is selected by each of the search modules. In the first round of search, the values of the comparative data are 11 are 5, 41, 66 and 123. The process to obtain the first two bits of the memory address of the target data with value 50 is described as follows:

(a1) In the first bank, the first search module 11 selects the value 5 with the memory address 000000 to compare with the value 50 of the target data, and the value 5 is smaller than the value 50 of the target data.

(b1) In the second bank, the second search module 11 selects the value 41 with the memory address 010001 to compare with the value 50 of the target data, and the value 41 is smaller than the value 50 of the target data.

(c1) In the third bank, the third search module 11 selects the value 66 with the memory address 100010 to compare with the value 50 of the target data, and the value 66 is larger than the value 50 of the target data.

(d1) In the fourth bank, the fourth search module 11 selects the value of 123 with the memory address 110011 to compare with the value 50 of the target data, and the value 123 is larger than the value 50 of the target data.

According to the first round of search, the first two bits of the memory address, 01, of the target data is thus obtained.

In the second round of search, the values of the comparative data selected by each of the search module 11 are 47, 41, 60 and 53. The process to obtain the first four bits of the memory address of the value 50 of the target data is described as follows:

(a2) In the first bank, the first search module 11 selects the value 47 with the memory address 010100 to compare with the value 50 of the target data, and the value of 47 is smaller than the value 50 of the target data.

(2) In the second bank, the second search module 11 selects the value 41 with the memory address 010001 to compare with the value 50 of the target data, and the value 41 is smaller than the value 50 of the target data.

(c2) In the third bank, the third search module 11 selects the value 60 with the memory address 011110 to compare with the value 50 of the target data, and the value of 60 is larger than the value 50 of the target data.

(d2) In the fourth bank, the fourth search module 11 selects the value 52 with the memory address 010111 to compare with the value 50 of the target data, and the value 52 is larger than the value 50 of the target data.

According to the second round of search, the first four bits of the memory address, 0101, of the value 50 of the target data is thus obtained.

In the second round of search, the values of the comparative data selected by each of the search module 11 are 47, 48, 50 and 52. The process to obtain the first six bits of the memory address of the value 50 of the target data is described as follows:

(a3) In the first bank, the first search module 11 selects the value 47 with the memory address 010100 to compare with the value 50 of the target data, and the value 47 is smaller than the value 50 of the target data.

(b3) In the second bank, the second search module 11 selects the value 48 with the memory address 010101 to compare with the value 50 of the target data, and the value 48 is smaller than the value 50 of the target data.

(c3) In the third bank, the third search module 11 selects the value 50 with the memory address 010110 to compare with the value 50 of the target data, and the value 50 equals to the value 50 of the target data.

(d3) In the fourth bank, the fourth search module 11 selects the value 52 with the memory address 010111 to compare with the value 50 of the target data, and the value 52 is larger than the value 50 of the target data.

According to the third round of search, the first six bits of the memory address, 010110, of the value 50 of the target data is thus obtained.

Figure 4:
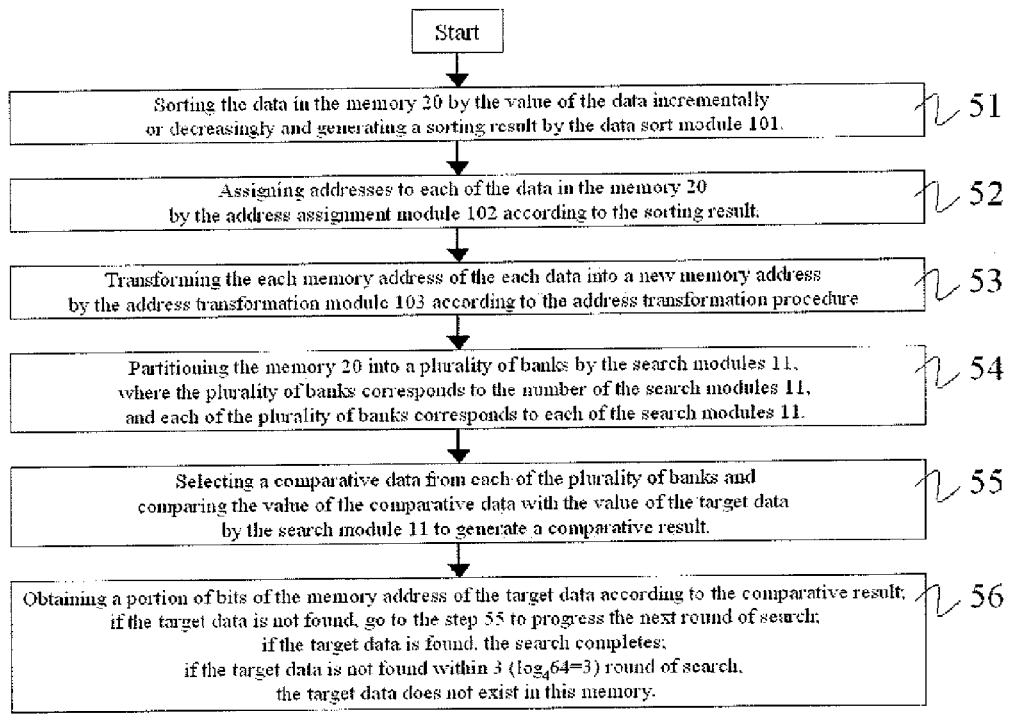
FIG. 4 is a flow chart illustrating a data search method according to an embodiment of the present invention.

Please refer to FIG. 4. FIG. 4 is a flow chart illustrating a data search method according to an embodiment of the present invention. A target data is to be search by utilizing the data search method. In FIG. 4, the data search method includes:

Step 51: sorting the data in the memory 20 by the value of the data incrementally or decreasingly and generating a sorting result by the data sort module 101;

Step 52: assigning addresses to each of the data in the memory 20 by the address assignment module 102 according to the sorting result;

Step 53: transforming the each memory address of the each data into a new memory address by the address transformation module 103 according to the address transformation procedure;

Step 54: partitioning the memory 20 into a plurality of banks by the search modules 11, where the plurality of banks corresponds to the number of the search modules 11, and each of the plurality of banks corresponds to each of the search modules 11;

Step 55: selecting a comparative data from each of the plurality of banks and comparing the value of the comparative data with the value of the target data by the search module 11 to generate a comparative result;

Step 56: obtaining a portion of bits of the memory address of the target data according to the comparative result; if the target data is not found, go to the step 55 to progress the next round of search; if the target data is found, the search completes; if the target data is not found within 3 ($\log^4 64=3$) round of search, the target data does not exist in this memory.

Please note that the order of the above steps may be adjusted in other embodiments to meet different requirements, and other necessary steps may also be inserted in this flow chart.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data search apparatus for searching for a target address of a target data in a memory comprising:
    a data sort module, for sorting a plurality of data in said memory;
    an address assignment module, for assigning an address to each of said plurality of data;
    an address transformation module, for transforming said address into a new address according to an address transformation procedure; and
    at least one comparative module, for obtaining a portion of bits of said target address of said target data according to a comparative data and said target data.

2. Said apparatus of claim 1, wherein the size of said memory is 2 to the power of N, where N is an integer.

3. Said apparatus of claim 1, wherein said address transformation procedure utilizes a logic operation.

4. Said apparatus of claim 3, wherein said logic operation utilizes an exclusive OR (XOR) operation.

5. Said apparatus of claim 1, wherein the space of said memory is partitioned into a plurality of banks.

6. Said apparatus of claim 5, wherein the number of said comparative modules corresponds to the number of said plurality of banks, and each of said plurality of banks corresponds to the each of said comparative modules.

7. Said apparatus of claim 6, wherein the each of said comparative module selects said comparative data from said corresponding bank.

8. Said apparatus of claim 1, wherein said comparative module compares the value of said comparative data with the value of said target data.

9. Said apparatus of claim 1, wherein said comparative module comprises a comparator.

10. A data search method for searching for a target address of a target data in a memory comprising:
    generating a sorting result by sorting a plurality of data in said memory;
    assigning a memory address to each of said plurality of data according to said sorting result;
    transforming said memory address into a new memory address according to an address transformation procedure; and
    obtaining a portion of bits of said target address of said target data according to a comparative data and said target data.

11. Said method of claim 10, wherein the size of said memory is 2 to the power of N, where N is an integer.

12. Said method of claim 10, wherein said address transformation procedure utilizes an exclusive OR (XOR) operation.

13. Said method of claim 10, further comprising:
    partitioning the space of said memory into a plurality of banks, wherein each of said plurality of banks corresponds to one of a plurality of comparators.

14. Said apparatus of claim 13, wherein the number of said plurality of comparators corresponds to the number of said plurality of banks.

15. Said method of claim 13, further comprising:
    selecting said comparative data by said comparator from said corresponding bank.

16. Said method of claim 13, further comprising:
    comparing the value of said comparative data with the value of said target data by said comparator.

17. A data search apparatus for searching for a target address of a target data in a memory comprising:
    a data storage apparatus, for sorting a plurality of data in said memory, assigning a memory address to each of said plurality of data, and transforming said memory address into a new memory address according to an address transformation procedure; and
    at least one search module, for obtaining a portion of bits of said target address of said target data according to a comparative data and said target data.

18. Said apparatus of claim 17, wherein said address transformation procedure is a logic operation.

19. Said apparatus of claim 17, wherein the space of said memory is partitioned into a plurality of banks.

20. Said apparatus of claim 19, wherein each of said plurality of banks corresponds to said search module, and the number of said plurality of banks corresponds to the number of said search module.

21. Said apparatus of claim 20, wherein said search module comprises a comparator.

22. Said apparatus of claim 20, wherein each of said search module selects said comparative data from said corresponding bank.

23. Said apparatus of claim 17, wherein said search module compares the value of said comparative data with the value of said target data.

24. A data search apparatus for searching for a target address of a target data in a memory comprising:
    a data sort module, for sorting a plurality of data in said memory;
    an address assignment module, for assigning an address to each of said plurality of data;
    an address transformation module, for generating a new address according to said address and an address transformation procedure; and
    at least one comparative module, for comparing a comparative data with said target data to obtain said target address of said target data;
    wherein said comparative data is selected from said memory.

25. Said apparatus of claim 24, wherein the memory is partitioned into a plurality of banks according to the number of the comparative module.

* * * * *